United States Patent Office 3,332,781
Patented July 25, 1967

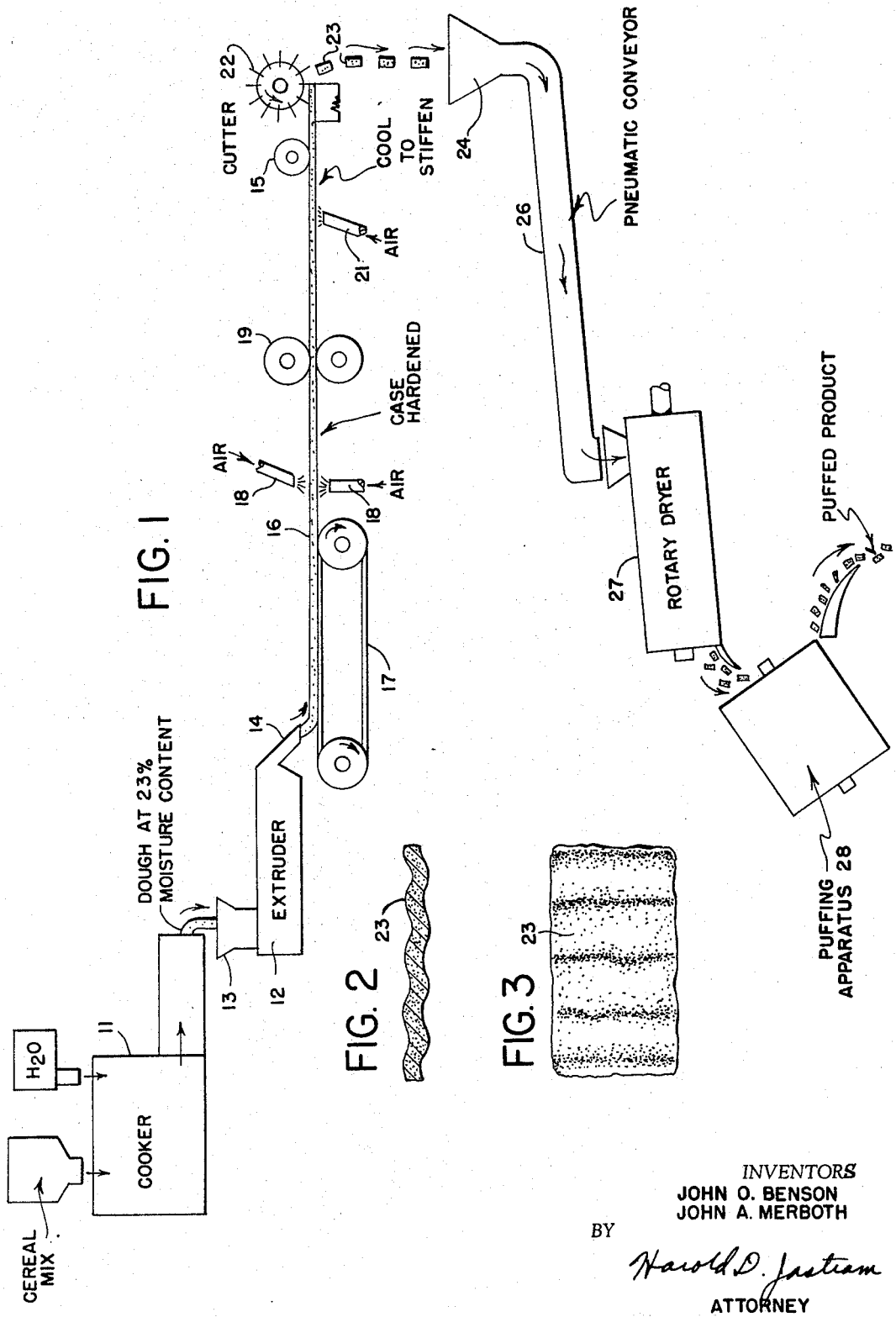

3,332,781
PROCESS FOR MAKING SHAPED CEREALS
John O. Benson, Mayer, and John A. Merboth, Hopkins, Minn., assignors to General Mills, Inc., a corporation of Delaware
Filed July 12, 1963, Ser. No. 294,496
9 Claims. (Cl. 99—81)

The present invention relates to food products and more particularly to a method of producing a cereal food product.

It is well known in the cereal industry that production of a toasted or puffed cereal product of uniform quality presents many perplexing problems. These problems are brought about by a number of factors. Cereal flakes, for instance, are commonly formed from whole kernels of cereal grains or cereal dough pellets. These cereal grains vary widely in uniformity of size, shape, moisture content, and so forth, with the result that flakes formed from these non-uniform grains respond with a wide range of variation to moisture reduction procedures, cooking, puffing, and the like. The pellets formed from cereal grain dough often respond in substantially the same manner as the whole grain flakes due to the non-uniformity of the pellets.

These non-uniformities present problems of quality control, packaging, and other problems. For instance, when non-uniform flakes are toasted, the smaller and thinner flakes will be burned whereas the thicker and larger flakes will not be cooked to a desired degree. The result is that the processor is forced to establish an acceptable quality product which may have some undesirable products intermixed. These non-uniformities in the toasting or puffing can often be traced to unusually high or low moisture concentrations which occur in the abnormally large or small flakes.

The non-uniformity of the finished product results in additional packaging problems. The flakes of varying size tend to separate in the containers in accordance with size with the result that the consumer may be presented with a high concentration of undesirably fine particles when the container is opened for use. Also the maintenance of the quality of the product while it remains on the shelf called "shelf life" is difficult since the relatively large incompletely cooked flakes will often contain a high concentration of moisture which will tend to shorten or at least make uncertain the "shelf life" of the product. This moisture problem is especially troublesome if the flakes are unusually thick.

There is at least one additional problem concerning the control of the shape of the flake. It is well known in the cereal industry that passing cereal kernels or pellets through bumping or flaking rolls improves the texture of the resulting puffed or toasted product. In such a flaked process, this also transforms the kernels or pellets into tender thin flakes. This process, while allowing some control upon the thickness of the flakes, does not readily permit control of the shape of the resulting flake. The physical agitation of the fragile flake causes breakage with the result that flakes of non-uniform shape and size are produced. As previously noted, these non-uniform flakes present numerous processing, quality control, and storage problems.

It is therefore an object of this invention to provide a new and improved method of producing a cereal food product of uniform quality.

It is another object of the present invention to provide a new and improved process for controlling the shape and size of the cereal food product to insure uniformity of cooking, puffing, and similar processing.

It is yet another object of the present invention to provide a new and improved process for providing cereal flakes which have a uniform concentration of moisture which thus permits accurate control of cooking and puffing of a product.

A further object of the present invention is to provide a new and improved process for producing cereal flakes by extruding a dough of the material into a sheet having thermoplastic characteristics and further processing the dough sheet to form dough flakes.

It is yet another object of the present invention to provide a new and improved process for extruding a sheet of cereal dough and reducing the thickness of the sheet to a particular or predetermined thickness desired for the flakes before the sheet is cut into pellets having a uniform shape and thickness.

It is a further object of the present invention to provide a new and improved process for producing a cereal flake having a uniform thickness and shape by using extrusion techniques to form a dough sheet and further, reducing the thickness of the sheet by stretching.

Another object of the present invention involves the application of extrusion to cereal doughs to form a thermoplastic material which may then be processed to produce pellets of uniform thickness and shape for the production of edible cereal flakes. The dough product is extruded into a thin sheet of material which then may be stretched to thin the dough further, if necessary. The dough sheet may then be tempered by cooling the outer surface of the sheet in order to produce a case hardening of the material forming the outer surface. After the tempering is completed, the thermoplastic material is then cut into pellets having a uniform thickness. Further reduction of the thickness of the dough might take place prior to cutting by passing the dough sheet through a pair of rollers or a similar mechanism to reduce the thickness. After slitting the sheet and cutting, the uniform pellets are dried in order to bring them to a desired moisture content. The moisture content of the pellets is equalized so that the pellets might be cooked or puffed or similarly processed. Equalizing is herein defined to mean processing the flakes so that each individual pellet contains a precise or relatively precise amount of moisture. It means that each of the flakes is within the acceptable range of moisture desired for cooking, bumping, or similar processing and that none of the flakes fall outside this equalized range. The equalized flakes are then puffed or cooked in a conventional manner.

These and other objects will become more apparent with reference to the specification and the drawings in which:

FIGURE 1 is an overall schematic view of a process for producing cereal grain products, FIGURE 2 is a cross section of a flake produced by the process schematically described in FIGURE 1, and FIGURE 3 is a top view of a flake prepared according to the process depicted in FIGURE 1.

The cereal grain employed to carry out the invention may be of any suitable character, such as, for example, rice, wheat, oats, barley, rye, corn, or any combination of two or more of the above grains or the like. Quite often the cereal product is a combination of some of the above grains and will work quite well when the process of this invention is applied. The above grains and combinations thereof are ground to a flour consistency and may contain a number of mineral salts and maybe some fiber or other material for producing a dry mix which will constitute the major portion of the cereal dough.

The dry cereal mix is fed together with a predetermined amount of water to form a dough. This dough is then cooked in a conventional cooker 11. Any type of cooker or oven may be utilized to heat the dough and at least partially cook the dough. In the cooker the dough is cooked for a period of time necessary to at least partly gelatinize the cereal grain. In a steam-type cooker it may take approximately one hour of cooking using steam in the cooker jacket.

After the dough is at least partially gelatinized, it is ejected from the cooker and introduced into an extruder 12. The dough leaving the cooker may contain about 20% to about 35% moisture. Preferably, the gelatinuous dough contains about 23% moisture as it enters the extruder hopper 13. The extruder 12 may be any one of several extruders such as those used in the plastics art.

The extruder nozzle 14 is shaped so that a sheet 16 of dough is extruded from the nozzle 14. The nozzle 14 contains an opening which will extrude a sheet of material of a desired thickness. This thickness can be controlled quite precisely simply by controlling the size of the opening in this nozzle. Consequently, an extruder 12 particularly lends itself to producing a sheet of cereal dough having a rather precise thickness. This precise thickness of dough permits the processor to govern the thickness of the dough and consequently the thickness of a final product. This control also permits precise control of later processing steps such as cutting, drying etc. The dough sheet may be of any thickness but preferably it is in the range of .035 to about .070 inch.

The sheet of dough 16 which is extruded from extruder 12 demonstrates thermoplastic characteristics. In other words, the sheet of dough will stretch and otherwise react in a manner quite similar to a plastic material known in the plastic arts. Consequently, the sheet 16 of cereal dough is deposited on a moving conveyor 17 in order to permit the dough to cool to some extent and also in order to prevent the dough from breaking away from the extruder nozzle 14 under its own weight. The conveyor 17 also has one additional function. It provides for further reduction of the thickness of the dough sheet 16 if further reduction is necessary. This reduction of the thickness of the dough sheet 16 is carried out by operating the conveyor 17 so that the conveyor moves the dough sheet 16 away from the nozzle 14 slightly faster than the dough is being extruded from the nozzle 14. This then results in a stretching of the dough sheet with a resultant thinning of the dough sheet. As an example it may be reduced to about .020 to 0.70 inch in thickness. The extent to which the cereal dough may be stretched is limited only by its thermoplastic characteristics and this in turn is determined somewhat as a result of the type of cereal grain used, the amount of moisture contained in the material, the temperature of the dough and so forth. Preferably, however, the dough sheet may be thinned to about .040 inch by stretching. It should be noted that it is possible to produce a dough sheet 16 which is sufficiently thinned as it comes from the nozzle 14 so that no further thinning by the conveyor 17 will be necessary.

In order to prepare the dough sheet for subsequent processing to attain certain desirable surface characteristics, the sheet may now be tempered or case hardened. In other words, the outer surface of the dough sheet 16 is cooled in order to solidify the outer surface to a greater extent than the inner material of the sheet. This case hardening or tempering of the sheet 16 may be carried out by a number of different ways. However, a very convenient means is illustrated by the air nozzle 18. Cooling air is introduced into the nozzle 18 and is directed at the upper and lower surfaces of the sheet 16. This quite rapidly cools the surface of the sheet and in effect case hardens the sheet leaving the inner material of the sheet 16 somewhat warmer and less viscous than the outer case hardened surface.

It may be necessary to thin the sheet further. A pair of squeeze rollers 19 might be positioned on either side of the sheet 16 to further reduce the thickness of the sheet. This rolling, because of the case hardened surface of the sheet, tends to produce a rippled surface. This rippled surface is often desirable in a cereal food product in order to give it a palatable and novel appearance. In a preferred embodiment, the sheet is reduced to about .032 to .040 inch in thickness. An example of the rippled surface may be seen in FIGURE 2 of the drawings where there is a cross section of a single flake. It is noted that the surface is rippled or corrugated to a marked extent.

Next the dough sheet is further cooled as, for example, by a nozzle 21 which is positioned to cast cooling air upon the surface of the sheet 16. Any suitable means may be utilized to cool the sheet 16, however, a nozzle 21 which directs cooling gas or air over the surface of the sheet works especially well. This cooling of the dough stiffens the sheet so that it is more easily handled when it is cut.

Next the sheet 16 engages a cutter 22 such as a rotary cutter illustrated in FIGURE 1 and if desired, a slitter 15. Any number of means may be utilized to cut the sheet of dough. For example, a guillotine type cutter might be used or a rotary cutter having pockets may be utilized to stamp odd shapes from the sheet. The sheet, however, does permit the use of a cutter which will produce pellets of uniform size which are easily processed as regards the moisture content and the shape of the finished product. The slitter 15 may optionally be used to cut the sheet 16 to a particular width. The pellets 23 are discharged from the cutter 22 into a hopper 24 of the pneumatic conveyor 26. The pellets 23 are conveyed along the pneumatic conveyor to a rotary drier 27.

In order to overcome one of the most difficult problems of maintaining quality and of cooking or puffing the product, the moisture of the individual pellets 23 are next equalized in a rotary drier 27. As previously noted, equalizing is herein defined as the process of bringing the moisture content of each of the pellets to a predetermined value, and of bringing the moisture within each pellet to a uniform value with no variation of moisture throughout the pellet. This means that the pellets are treated so that the moisture content of each of the pellets and of areas within each pellet are the same within very confined limits. It is not desired to merely have a range of moisture content for the mass of the pellets where some of the pellets have a great deal more moisture than others. Likewise, it is not desired to merely have a range of moisture content for the various areas within a pellet i.e. outer shell and centre. It is, on the other hand, desired that each pellet have the same moisture content or nearly the same, and that all of the areas within each pellet have the same moisture content. Uniformity of moisture content of areas within a pellet is desired in order to insure uniform puffing or other processing of the individual pellets. This equalization is more easily accomplished by using, as previously noted, uniform shaped flakes of uniform thickness and cross section. These, of course, are provided for by the novel techniques utilized in providing a sheet of material of uniform thickness and cutting the flakes of uniform size.

The equalizing or drying of the flakes to bring the flakes to a predetermined moisture content takes place in a drier and preferably a rotary drier 27. The pellets enter the drier having a relatively high moisture content. It may be 20% or more. The pellets are retained in the drier for a sufficient time and warm air may be directed through the pellets so that the moisture content of the pellets is reduced substantially. The drying air is preferably maintained at elevated temperatures, however room temperature or cooler air will satisfactorily dry or equalize the pellets with only a loss in efficiency. When warm air is used, it should be at temperatures which are below the temperature which produces case hardening of the pellets. The temperature at which a pellet case hardens varies with the composition of the pellet and similar factors.

Preferably, the moisture content is reduced to about 6% to about 20%. In a preferred embodiment, the moisture content of each of the pellets is brought to about 11.5%. This drying or equalizing of the moisture content of the pellet is successfully accomplished by using a rotary drier 27 which agitates the pellets while warm air at from about 130° to about 160° Fahrenheit is directed through the agitated pellet. This moving air insures that the moisture is carried away from the pellet and the agitation together with the moving air insures that each of the pellets is equalized to a predetermined moisture level. The equalizing may take from about 50 to about 90 minutes or longer depending on air temperature etc. The length of time that a product remains in the drier of course is going to be dependent primarily on the moisture content of the pellets 23 as they enter the drier 27. The moisture content of the pellet must, however, be equalized to contain a percentage of moisture which will permit effective puffing or cooking of the product so that the finished product is of uniform taste, color, and quality.

After the moisture content of the pellets has been reduced to a predetermined value, the pellets are discharged from the rotary drier 27 and are next introduced into a puffing apparatus 28 such as that illustrated in copending application Ser. No. 198,936, filed May 31, 1962, now Patent No. 3,253,533.

In this particular type of puffing apparatus, the equalized pellets 23 are brought in contact with salt or some other granular material which has been heated to elevated temperatures. Heat transferred to the pellets 23 from the granular material causes the pellets to puff and form flakes of uniformly puffed cereal products which are tender, uniformly colored, uniformly cooked and of high uniform quality.

It is to be understood that the above described process and apparatus are simply illustrative of an application of the principles of the invention and many other modifications may be made without departing from the spirit and scope of the invention.

Now therefore we claim:

1. A process of making a cereal food comprising the steps of depositing a sheet of cereal dough on a conveyor, stretching the sheet by moving the cereal dough on said conveyor faster than it is deposited on said conveyor, hardening the surfaces of said layer by cooling with a non toxic cooling gas, cutting the surface hardened sheet into pieces of uniform shape, size and thickness, and then drying said pieces for a sufficient period of time to equalize the moisture content of each piece.

2. A process of making a ready-to-eat cereal food comprising the steps of partially gelatinizing the cereal dough product, extruding a ribbon of said gelatinous product, stretching the ribbon to reduce the thickness of the ribbon, tempering the stretched product to surface harden the product, further reducing the thickness of the product by passing the ribbon between spaced surfaces which squeeze the ribbon, cutting the ribbon into pieces of uniform shape, size and thickness, subjecting the pieces to elevated temperatures for a sufficient period of time to equalize the moisture content of the individual pieces, and then cooking the pieces.

3. A process of making a ready-to-eat cereal food comprising the steps of extruding a sheet of cereal dough having a moisture content of from about 20% to about 35%, hardening the surfaces of said sheet by cooling, cutting the sheet into pellets of uniform shape, size and thickness, and then subjecting the pellets to a drying medium for a sufficient period of time to equalize the moisture content at about 6% to about 20% in the individual pellets.

4. A process in accordance with claim 3 in which said pellets are agitated while they are subjected to said drying medium.

5. A process of making a ready-to-eat cereal food comprising the steps of extruding a sheet of cereal dough having a moisture content of about 20% to about 35%, tempering said sheet by surface cooling the cereal dough with a non toxic cooling gas, reducing the thickness of said sheet and simultaneously rippling the cooled surface, cutting the sheet into pellets of uniform shape, size and thickness, and then subjecting the pellets to elevated temperatures for a sufficient period of time to equalize the moisture at from about 6% to about 20% in the individual pellets.

6. A process in accordance with claim 5 in which the thickness of the extruded sheet is from about .035 inch to about .070 inch and which further includes the step of stretching said sheet prior to tempering to reduce the thickness of said sheet.

7. A process of making a read-to-eat cereal food comprising the steps of extruding a sheet of cereal dough having a moisture content of about 20% to about 35%; hardening the surfaces of said sheet by cooling; cutting the sheet into pellets of uniform shape, size, and thickness; and then subjecting the pellets to elevated temperatures for a sufficient period of time to equalize the moisture content at about 6% to about 20% in the individual pellets.

8. A process of making a cereal food comprising the steps of partially gelatinizing the cereal dough product, extruding a ribbon of said gelatinous product, stretching the ribbon to reduce the thickness of the ribbon, tempering the stretched product to surface harden the product; further reducing the thickness of the product by passing the ribbon between spaced surfaces which squeeze the ribbon; cutting the ribbon into pieces of uniform shape, size, and thickness; subjecting the pieces to elevated temperatures for a sufficient period of time to equalize the moisture content of the individual pieces; and then puffing the pieces.

9. A process of making a cereal food comprising the steps of partially gelatinizing the cereal dough product, extruding a ribbon of said gelatinous product having a moisture content of from about 20% to about 35%; stretching the ribbon to reduce the thickness of the ribbon; tempering the stretched product to surface harden the product; further reducing the thickness of the product by passing the ribbon between spaced surfaces which squeeze the ribbon; cutting the ribbon into pieces of uniform shape, size and thickness; subjecting the pieces to elevated temperatures for a sufficient period of time to equalize the moisture content of the individual pieces at about 6% to about 20%, and then cooking the pieces.

References Cited

UNITED STATES PATENTS

| | | | |
|---|---|---|---|
| 1,925,267 | 9/1933 | McKay | 99—81 |
| 2,131,450 | 9/1938 | McKay | 99—81 |
| 2,339,419 | 1/1944 | McKay | 99—81 |
| 2,863,770 | 12/1958 | Spieser | 99—207 XR |
| 2,882,162 | 4/1959 | Holahan | 99—80 |
| 3,076,711 | 2/1963 | Gerkens | 99—207 XR |

A. LOUIS MONACELL, *Primary Examiner.*

R. N. JONES, *Examiner.*

UNITED STATES PATENT OFFICE
CERTIFICATE OF CORRECTION

Patent No. 3,332,781                          July 25, 1967

John O. Benson et al.

It is hereby certified that error appears in the above numbered patent requiring correction and that the said Letters Patent should read as corrected below.

Column 3, line 45, for "0.70" read -- .070 --.

Signed and sealed this 16th day of July 1968.

(SEAL)
Attest:

Edward M. Fletcher, Jr.                      EDWARD J. BRENNER
Attesting Officer                            Commissioner of Patents